(12) United States Patent
Sicola et al.

(10) Patent No.: US 6,279,078 B1
(45) Date of Patent: Aug. 21, 2001

(54) APPARATUS AND METHOD FOR SYNCHRONIZING A CACHE MODE IN A DUAL CONTROLLER, DUAL CACHE MEMORY SYSTEM OPERATING IN A PLURALITY OF CACHE MODES

(75) Inventors: Stephen J. Sicola, Monument; Wayne H. Umland, Colorado Springs; Clark E. Lubbers, Colorado Springs; Susan G. Elkington, Colorado Springs, all of CO (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 08/668,512

(22) Filed: Jun. 28, 1996

(51) Int. Cl.[7] .............................. G06F 12/16; G06F 11/16
(52) U.S. Cl. .......................... 711/119; 711/162; 711/165; 714/6; 714/12; 714/15; 714/42
(58) Field of Search ..................................... 711/119, 120, 711/129, 130, 162, 165, 152, 163; 395/182.04, 182.09, 182.1, 182.13, 183.18; 714/6, 11, 12, 15, 42, 7; 710/200

(56) References Cited

U.S. PATENT DOCUMENTS

| | | | |
|---|---|---|---|
| 5,437,022 | * 7/1995 | Beardsley et al. | .................. 711/120 |
| 5,479,413 | * 12/1995 | Sicola et al. | .......................... 714/718 |
| 5,544,347 | * 8/1996 | Yanai et al. | ........................... 711/162 |
| 5,553,263 | * 9/1996 | Kalish et al. | ........................ 711/127 |
| 5,574,863 | * 11/1996 | Nelson et al. | ....................... 710/100 |
| 5,588,110 | * 12/1996 | DeKoning et al. | .................. 711/156 |

* cited by examiner

*Primary Examiner*—Glen Gossage
(74) *Attorney, Agent, or Firm*—Ronald C. Hudgens; William J. Kubida; Hogan & Hartson LLP

(57) ABSTRACT

An apparatus and method for synchronizing a cache mode in a cache memory system in a computer to protect cache operations. The cache memory system has a first controller and a second controller and two cache modules and operates in a plurality of cache modes. The cache mode is stored as metadata in the cache modules and is detected by the first controller to determine the cache mode. Lock signals in the first controller are set in accordance with the cache mode detected to set the cache mode state in the first controller. The second controller copies the cache mode state from the first controller to synchronize both controllers in the same cache mode state. After a failure of the second controller, the first controller may lock access to both caches to recover data previously accessed by the second controller. The second controller restarts and copies the cache mode state from the first controller, so that both controllers return to the cache mode state prior to the failure of the second controller.

8 Claims, 6 Drawing Sheets

APPARATUS AND METHOD FOR SYNCHRONIZING A CACHE MODE IN A DUAL CONTROLLER, DUAL CACHE MEMORY SYSTEM OPERATING IN A PLURALITY OF CACHE MODES

CROSS REFERENCE TO RELATED APPLICATIONS

The following copending, commonly assigned patent applications describe control operations used with the present invention and are hereby incorporated by reference.

1. "Simultaneous, Mirror Write Cache" by Tom Fava, et al., Ser. No. 08/671,154, filed concurrently herewith, now U.S. Pat No. 5,802,561.

2. "Enabling Mirror, Non-Mirror and Partial Mirror Cache Modes in a Dual Cache Memory" by Susan Elkington et al., Ser. No. 08/671,153, filed concurrently herewith, now U.S. Pat. No. 5,974,506.

BACKGROUND OF INVENTION

1. Field of the Invention

This invention relates to synchronizing dual controllers in a cache memory system having two cache modules. More particularly, the invention relates to synchronizing the controllers whereby the controllers may control mirror and non-mirror writes to the cache modules and preventing one controller from improperly accessing a cache module under control of the other controller.

2. Description of Related Art

To date, cache memory systems where there is a mirror write operation have used two separate memory caches and written the data word, or block, first in one cache, read it from that cache and mirror-written it to the second cache. The advantage of writing a data word to two separate cache modules is the greatly enhanced reliability of the cache memory system. Such a mirror cache system carries the penalty, of course, that if each word unit is written twice, the capacity of the cache memory system is effectively cut in half.

There may be situations where the mirroring of data in two cache modules is not required. For example, if the data is only to be read, it is not necessary to write such data from main memory to two cache modules. This is true because if the data is lost from the cache module where it is written, it may be recovered from main memory. Also, users of the system may opt to have greater cache capacity rather than to mirror write data in two cache modules. Accordingly it is desirable to operate in both a mirror cache mode and a non-mirror cache mode in a dual cache module system.

In a dual controller, dual cache system there is a need to control the access of each controller to each cache module. It is important to prevent one controller from accessing the cache modules improperly if the controller malfunctions. Further, the control functions are needed in both a mirror cache mode and a non-mirror cache mode.

SUMMARY OF THE INVENTION

In accordance with this invention, the above problem has been solved by controlling accesses between controllers and cache modules in a cache memory system in a computer. The cache memory system has two controllers and two cache modules and operates in a non-mirror cache mode and a mirror cache mode. Data indicating the cache mode to be used is stored as metadata in the cache modules. The metadata in the cache modules is detected to determine the cache mode. Lock signals in one of the controllers are set in accordance with the cache mode to set the cache mode state of the controller. The cache mode state being mirror or non-mirror state. The other controller copies the lock state from the first controller to synchronize both controllers in the same cache mode state.

In another feature of the invention one of the controllers acts as a surviving controller detecting that the other controller is a failed controller. The surviving controller locks access to both cache modules to recover data previously accessed by the failed controller. The surviving controller runs in the cache mode state of the cache mode prior to failure of the failed controller. The failed controller starts-up so that it is a restarted failed controller. The lock state of the surviving controller is copied by the restarted failed controller whereby the controllers return to a lock state in the cache mode existing prior to failure of the restarted failed controller.

As another feature of the invention one controller detects that the cache mode has changed from an old mode to a new mode. This controller sets the lock signals so that it is in a lock state corresponding to the new mode. The other controller copies the lock signals so that it is in the new lock state corresponding to the new mode.

The great advantage and utility of the present invention is the control of access, synchronization and direction of error messages in the dual controller, dual cache system.

The foregoing and other features, utilities and advantages of the invention will be apparent from the following more particular description of a preferred embodiment of the invention as illustrated in the accompanying drawings.

DETAILED DESCRIPTION OF PREFERRED EMBODIMENTS

Figure 1:
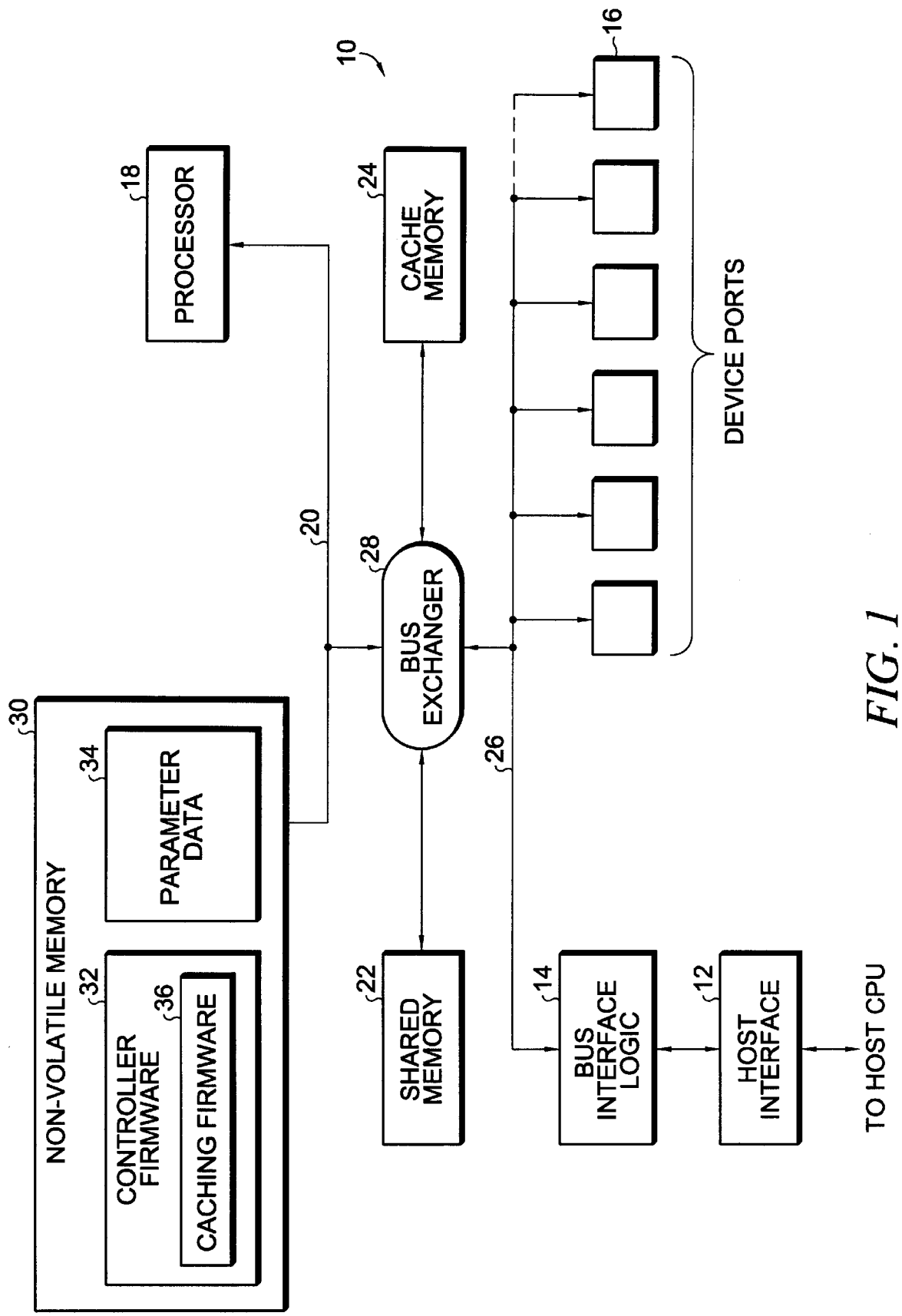
FIG. 1 illustrates a storage controller for performing the operations in accordance with the preferred embodiments of the invention.

Each of the storage controllers in the dual controllers, dual cache modules preferred embodiment of the present invention are implemented in a digital computing system environment, as illustrated by the storage controller 10 in FIG. 1. Storage controller 10 bridges a host interface 12 via a bus interface logic block 14 to one or more device ports 16. These device ports provide an access path to physical media (not shown). Controller 10 further includes a processor 18 residing on a native bus 20, a cache memory 24 and a shared memory 22.

Separate buses connected to shared memory 22 and cache memory 24 are interconnected to the native bus 20 and a bus 26 by way of a bus exchanger 28. Bus 26 is used to access the host interface through the bus interface logic block 14 and to access device ports 16. The bus exchanger is a cross bar which provides fast access by all entities to all parts of the controller. In addition to providing required bus interface logic, the bus interface logic block 14 includes other functional components needed to perform low-level device and host port operation support.

Sharing the native bus 20 used by the processor is a non-volatile memory 30. The non-volatile memory 30 stores the controller firmware 32 and parameter data 34. Non-volatile memory 30 is read each time the controller boots. Included as a subcomponent of the controller firmware is the caching firmware 36. Although the controller firmware is contained in non-volatile memory 30, it is copied to shared memory 22 at initialization of the controller for subsequent execution by processor 18. In accordance with the preferred embodiment of this invention, the cache controlling operations described hereinafter are performed by processor 18 working with the caching firmware and operating on cache modules represented by cache memory 24 in FIG. 1.

Figure 2A:
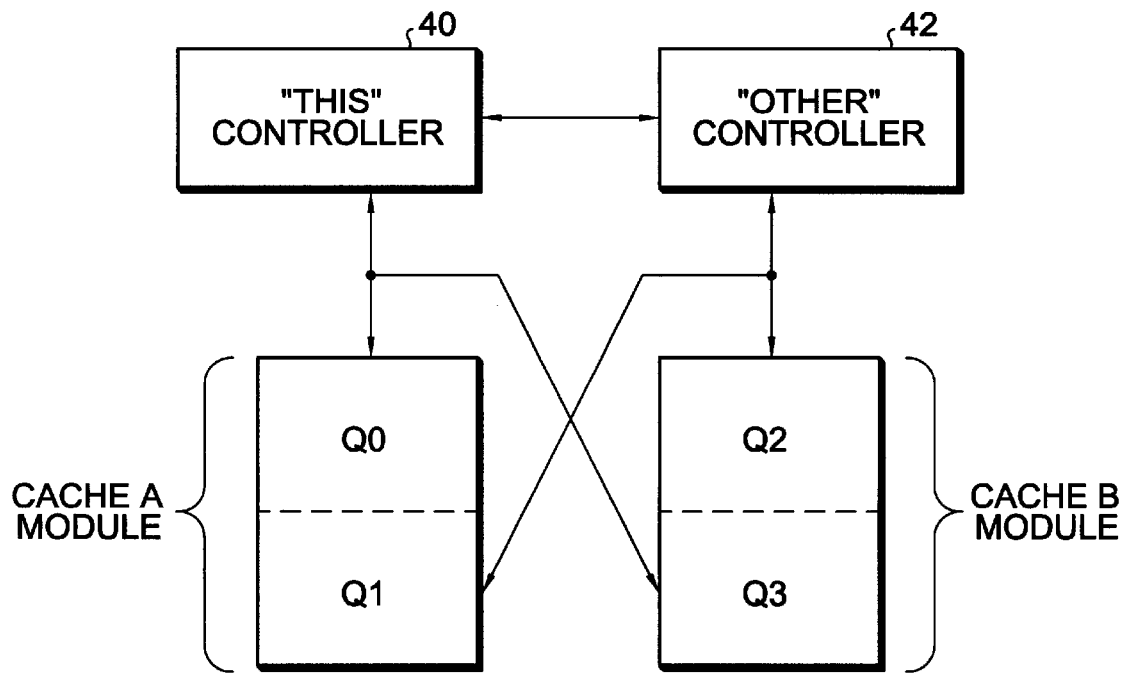
FIG. 2A illustrates the information flow in mirror cache mode for a dual controller, dual cache embodiment of the invention.

FIG. 2A illustrates the flow of information in a cache write mode in the preferred embodiment of the invention where dual controllers and dual cache modules are utilized. The architecture of this dual controller/dual cache module configuration is described in detail in copending commonly-assigned application entitled "Simultaneous, Mirror Write Cache," Ser. No. 08/671,154 cross-referenced above and incorporated herein by reference, and now U.S. Pat. No. 5,802,561. In this dual controller/dual cache architecture the two cache A and B modules are divided in half so as to form four cache quadrants Q0, Q1, Q2 and Q3. The two controllers are identical to each other and are identified as THIS controller 40 and OTHER controller 42. Each of these controllers has access to all of the quadrants Q0 through Q3. With such an architecture, a failure of a cache module or a failure of one of the controllers still permits access to all data in a good quadrant of a cache module.

FIG. 2A illustrates the simultaneous mirror write cache mode flow of information between controllers and between each controller and the cache modules. In simultaneous mirror write cache mode, THIS controller 40 has simultaneous access to quadrants Q0 and Q3 for writing the same data word simultaneously in both of these quadrants.

Similarly, OTHER controller 42 has simultaneous access to quadrants Q1 and Q2 to simultaneously write the same data word unit to quadrants Q1 and Q2.

Figure 2B:
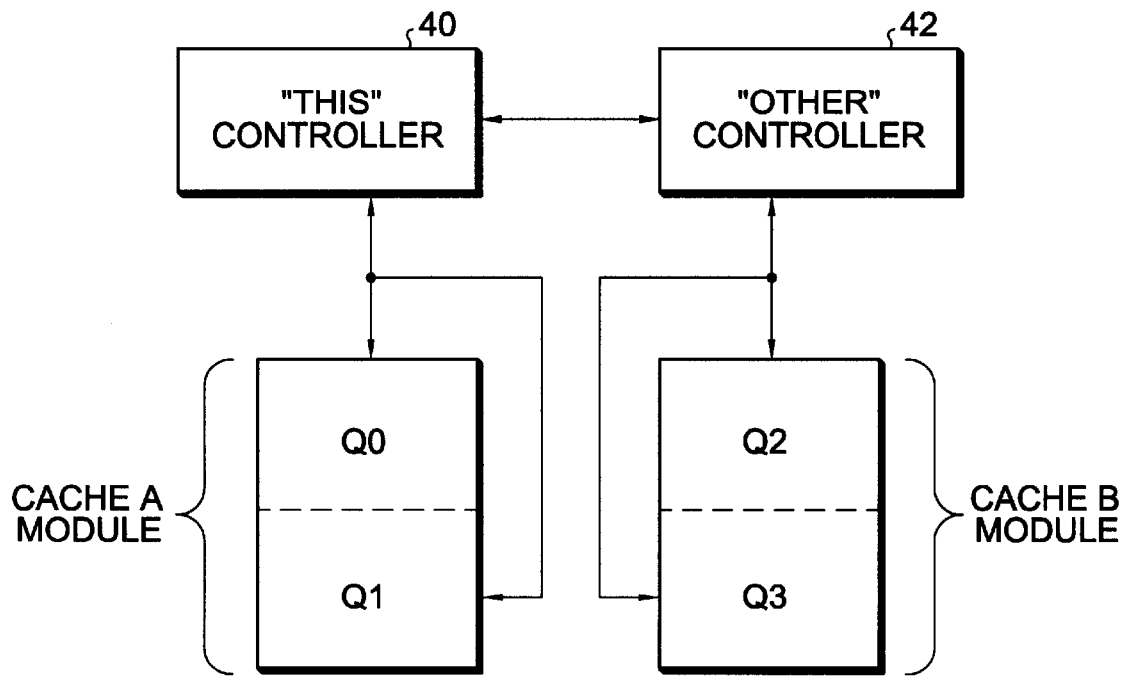
FIG. 2B illustrates the information flow in a non-mirror cache mode for a dual controller, dual cache embodiment of the invention.

FIG. 2B represents the same architectural cache memory system as FIG. 2A, except that FIG. 2B is operating in non-mirror cache mode. In non-mirror cache mode, THIS controller 40 has access to all of cache A module, but is writing or reading only to Q0 or Q1 in a given read/write cycle. Similarly, OTHER controller 42 in a read/write cycle reads or writes data to only one location in cache B module, quadrants Q2 or Q3. As discussed above, while THIS controller normally writes to cache A module in the non-mirror cache mode, THIS controller 40 has the capability of also reading and writing to cache B module in non-mirror cache mode. Similarly, OTHER controller 42 has the capability of writing to cache A module in non-mirror cache mode.

Figure 2C:
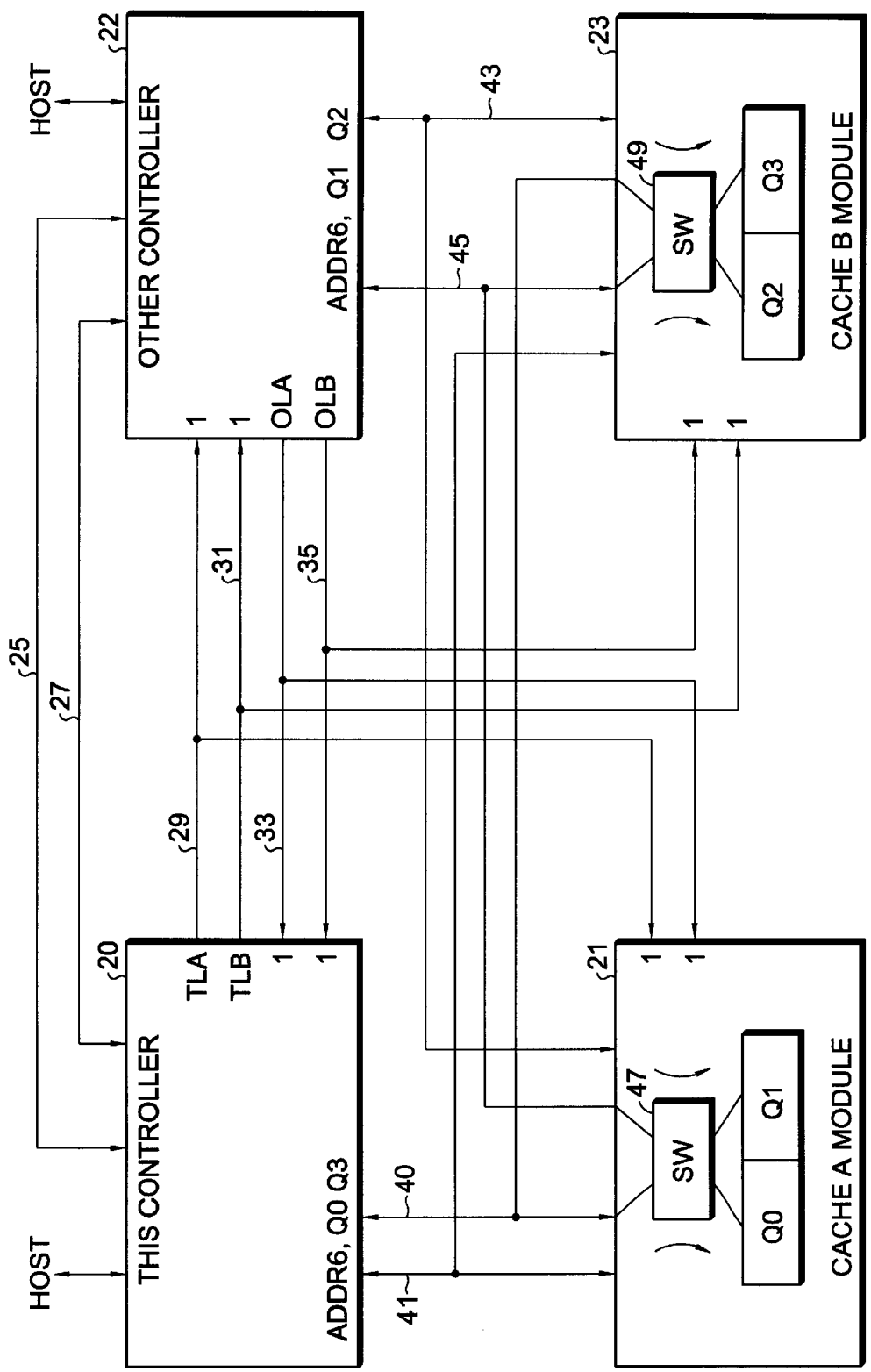
FIG. 2C shows the details of the dual controller dual cache system including the lock control signals.

FIG. 2C illustrates the switching of the address/data bus connection to the quadrants in the cache modules under control of lock signals from the controllers. FIG. 2C illustrates the normal mirrored write operation. Controllers 20 and 22 and Cache A Module 21 and Cache B Module 23, along with the connections between each of these components are mirror images of each other. THIS controller 20 and OTHER controller 22 work with each other through a message link 25 and various control lines. Control Line 27 is a hard reset or kill line whereby either controller 20 or controller 22 may hard reset or kill the other controller. Control Lines (signals) 29, 31, 33 and 35 are lock lines (signals) that lock the operation of Cache Module A 21 (Cache Module 0) and Cache Module B 23 (Cache Module 1). Control Line 29 is the THIS Locks A (TLA) control line. Similarly, control Line 31 is the TLB (THIS Locks B) control line. Control Line 33 is the OLA, (OTHER Locks A) control line. Finally, control Line 35 is the OLB or OTHER locks B control line. In a normal mirror write operation, all of these control lines 29, 31, 33 and 35 are high or in a binary 1 state as indicated in FIG. 2C.

There are also control lines between each of the controllers 20 and 22 and the Cache Modules 21 and 23. Control lines 41 pass request, acknowledge, read/write state and sync signals between THIS controller 20 and Cache A Module 21 and Cache B Module 23. Control lines 43 similarly pass request, acknowledge, read/write state and sync signals between OTHER controller 22 and Cache A Module 21 and Cache B Module 23. Address/Data bus 40 passes the address and subsequently data words from THIS controller 20 to Cache A Module 21 and Cache B Module 23. Address/Data bus 45 similarly passes address and data words from OTHER controller 22 to Cache B Module 23 and Cache A Module 21.

In each of the Cache Modules, 21 and 23, there is a switch between the address/data buses 40 and 45 and the quadrants of the cache module. In Cache A Module 21, switch 47 directs address/data bus 40 to Quadrant Q0 and address/data bus 45 to Quadrant Q1. Switch 47 is controlled by the TLA and OLA lock signals. In the mirror write operation both of these lock signals are high or in a binary 1 state.

Switch 49 in Cache B Module 23 is also in a mirror write condition due to the binary 1 inputs from the TLB and the OLB control Lines 31 and 35. Accordingly, switch 49 connects address/data bus 45 to Quadrant Q2 and connects address/data bus 40 to Quadrant Q3.

Figure 3A:
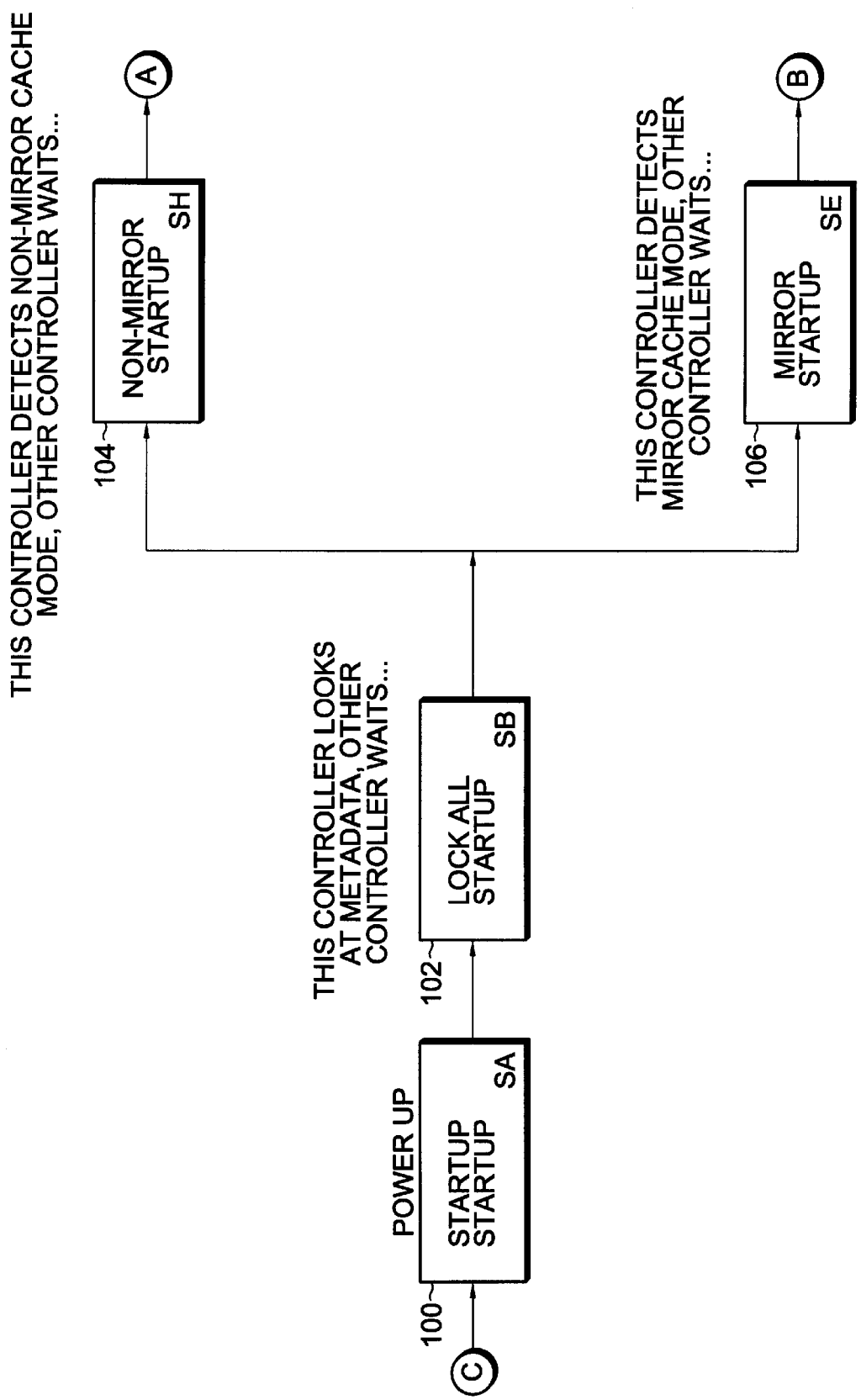
FIGS. 3A, 3B and 3C together illustrate lock states and the flow of operations through the lock states in the preferred embodiment of the invention.
Figure 3B:
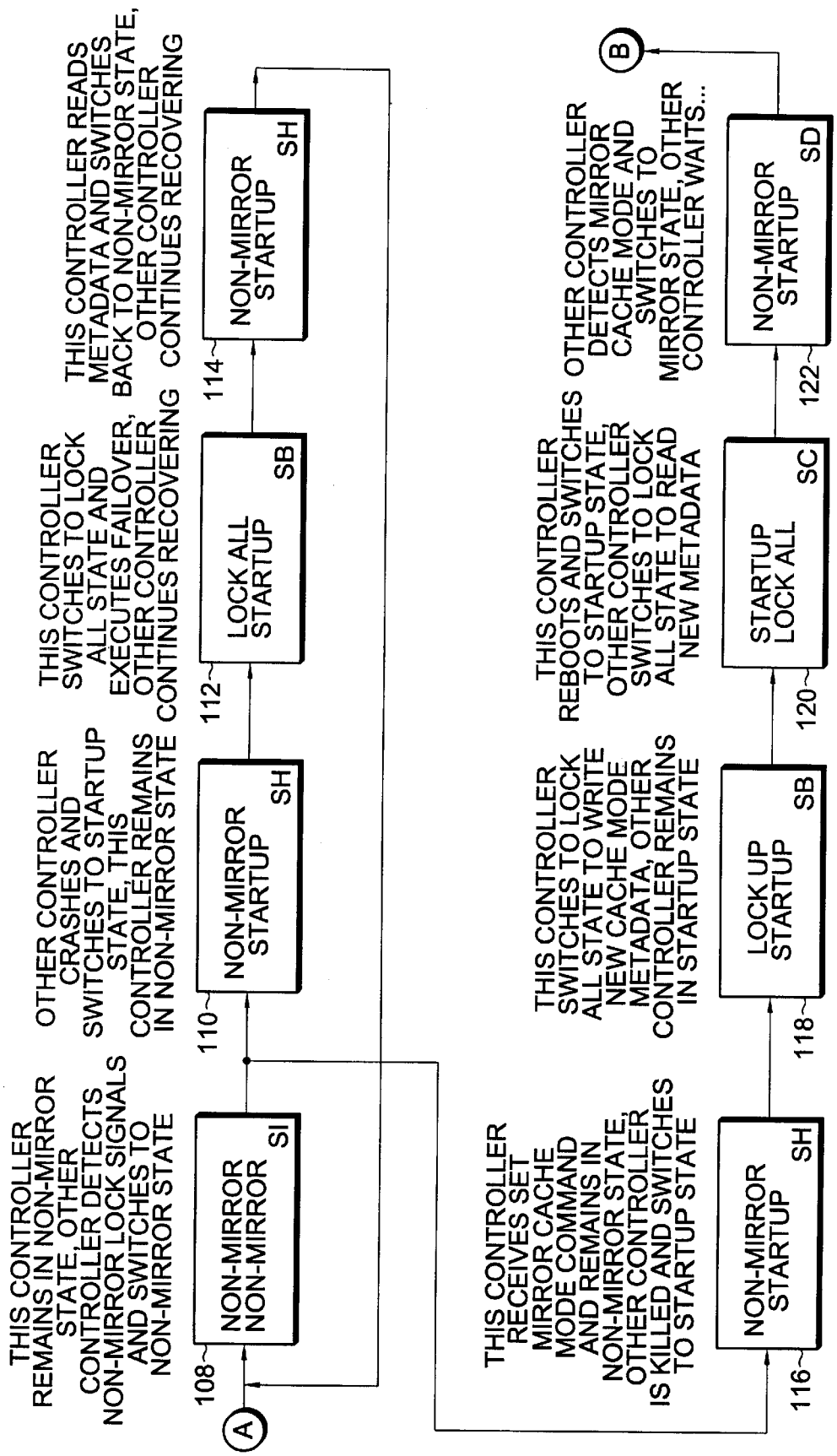
Figure 3C:
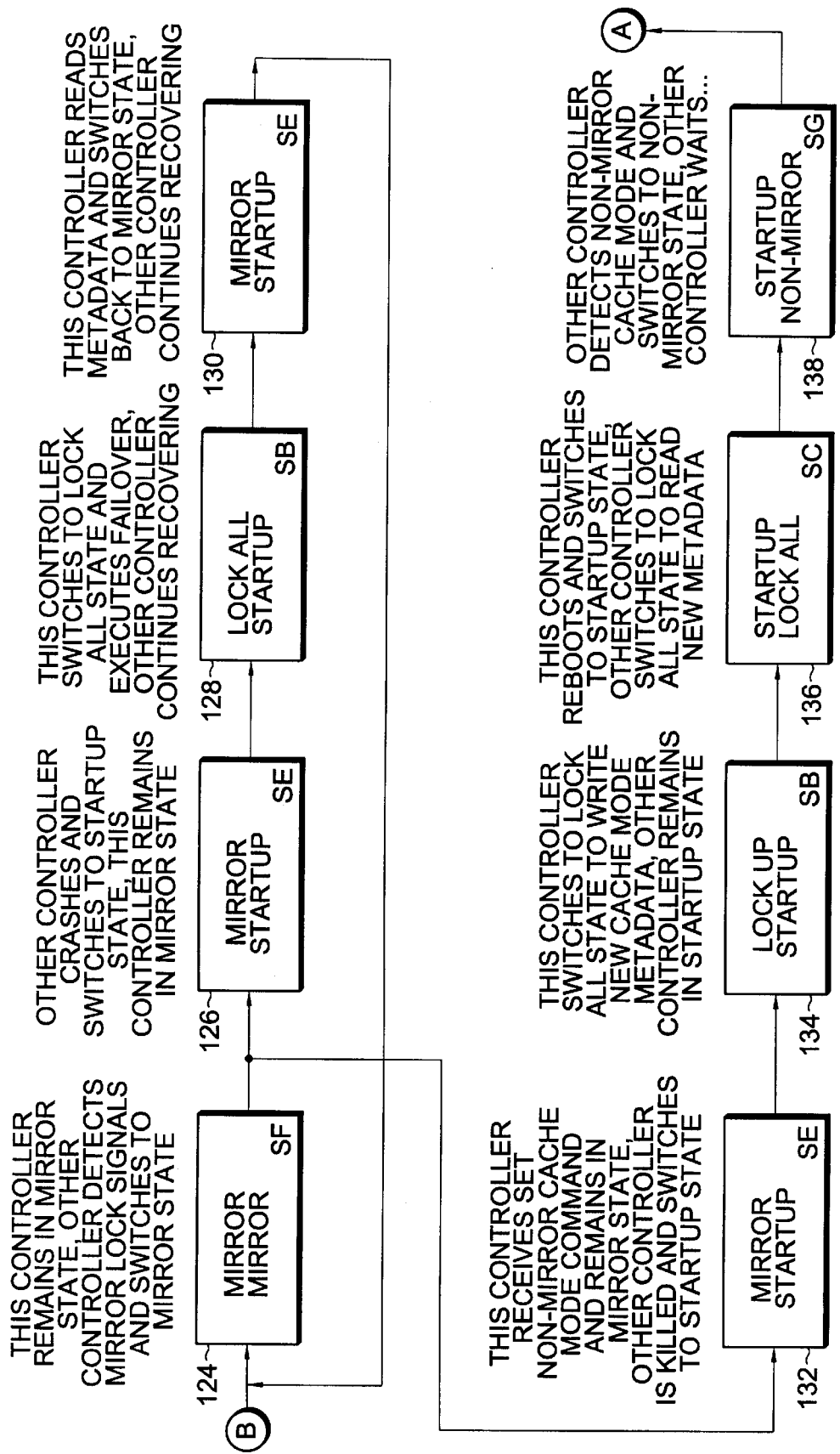

FIG. 2C is illustrative of the lock signals in the mirror cache mode operation of the simultaneous mirror write cache system. The other lock states and the operative flow between lock states is illustrated in FIGS. 3A, 3B and 3C. The following table is a list of the operative lock states. The state code SX(x=A to I) in the left most column of the table is shown in the lower righthand corner of each of the state blocks in FIGS. 3A, 3B and 3C.

| STATE | TLA | TLB | OLA | OLB | | Q0 | Q1 | Q2 | Q3 |
|---|---|---|---|---|---|---|---|---|---|
| SA | 0 | 0 | 0 | 0 | Startup | T | T | 0 | 0 |
| SB | 1 | 0 | 0 | 0 | T_Failover | T | T | T | T |
| SC | 0 | 0 | 0 | 1 | O_Failover | 0 | 0 | 0 | 0 |

-continued

| STATE | TLA | TLB | OLA | OLB |  | Q0 | Q1 | Q2 | Q3 |
|-------|-----|-----|-----|-----|--|----|----|----|----|
| SD | 0 | 0 | 1 | 1 | O_Mirror/Crash | 0 | 0 | 0 | 0 |
| SE | 1 | 1 | 0 | 0 | T_Mirror/Crash | T | T | T | T |
| SF | 1 | 1 | 1 | 1 | Mirror | T | 0 | 0 | T |
| SG | 0 | 0 | 1 | 0 | O_Non-Mirror/Crash | T | T | 0 | 0 |
| SH | 1 | 0 | 0 | 0 | T_Non-Mirror/Crash | T | T | 0 | 0 |
| SI | 1 | 0 | 1 | 0 | Non-Mirror | T | T | 0 | 0 |

The Q columns in the above table correspond to quadrants Q0, Q1, Q2 and Q3 in the cache modules 21 and 23 and indicate whether THIS controller 20 or OTHER controller 22 has access to the quadrants. A T in a column indicates that THIS controller has access during that state. An O in a quadrant column indicates OTHER controller has access during that state. If one of the controllers attempts to access a quadrant when not permitted according to the lock signals, TLA, TLB, OLA and OLB, and as indicated by the columns, an error will be directed to the errant controller.

FIGS. 3A, 3B and 3C illustrate the operational flow through states of operation by THIS controller and OTHER controller to synchronize access to cache A module and cache B module using the lock signals. The convention in the state diagrams is that in each state block the uppermost row entry indicates the state of THIS controller and the lower entry indicates the state of the OTHER controller. In FIG. 3A, at power up in state 100, both controllers are in startup state. In this state, each controller has not yet determined which lock state to go to. Each controller is not accessing or using for access any of the quadrants in cache A module or cache B module during state 100. Both controllers during state 100 are booting up. When a first one of the controllers completes its boot sequence, the controllers enter state 102 in FIG. 3A. In FIG. 3A it is assumed that THIS controller has completed the boot sequence first. In state 102, after THIS controller has booted up, it enters a lock all state and OTHER controller remains in the startup state and waits. During the lock all state by THIS controller, the controller looks at a metadata in all of the quadrants Q0 through Q3. From the metadata THIS controller determines the next lock state to go to. Meanwhile, OTHER controller stays in the start up state and waits. If THIS controller detects a non-mirror cache mode, the next state in FIG. 3A will be state 104. In state 104, THIS controller generates the non-mirror lock signals. The non-mirror lock signals set THIS controller to have access to quadrants Q0, Q1, both in cache A module. OTHER controller remains in start-up state and waits.

If THIS controller detects the mirror cache mode from the metadata, then the operation flow goes to state 106. In state 106, THIS controller is in mirror state and sets the lock signals so that THIS controller has access to quadrants Q0 in cache A module and quadrant Q3 in cache B module. OTHER controller remains in the start up state and waits.

From state 104 where THIS controller has switched to non-mirror state and set the non-mirror lock signals, the next state is shown in FIG. 3B as state 108. In state 108, THIS controller remains in non-mirror state and OTHER controller has detected the non-mirror lock signals from THIS controller and has switched its state to non-mirror state. When OTHER controller sets its locks to non-mirror, OTHER controller has access to quadrants Q2 and Q3 in cache B module. State 108 is the normal non-mirror cache mode operation for both controllers running in non-mirror state. Either of two conditions can cause the cache system to leave state 108. First, if OTHER controller crashes the operation flow switches to state 110. In state 110, THIS controller is in non-mirror state generating the non-mirror lock signals for THIS controller and OTHER controller is in start up state. The OTHER controller in this situation might have crashed either due to a software bug, a hardware defect, or possibly a user command through the command line interpreter telling OTHER controller to shut down. In any event, after state 110, the operation flow proceeds to state 112, where THIS controller switches to a lock all state and OTHER controller remains in start up state. With THIS controller in lock all state, THIS controller has access to all four quadrants and can thus recover data previously accessed through OTHER controller (a fail over operation). After executing the fail over operation, THIS controller reads the metadata and switches back to non-mirror mode as indicated in state 114. OTHER controller continues in the start up state recovering from its shut down or crash. If OTHER controller correctly recovers and comes back up, then it will copy the non-mirror state from THIS controller and the operation flow returns to state 108 where both controllers operate in non-mirror state.

The other condition by which a normal non-mirroring operation, i.e. state 108, is left, is the receipt of a set mirror mode command received through a command line interpreter from the user. Assuming THIS controller receives this set mirror mode command, then the operation flow transitions from state 108 to state 116. In state 116 THIS controller temporarily remains in a non-mirror state and OTHER controller is killed so that it returns to start up state. After state 116, the operation flow moves to state 118 where THIS controller writes the new metadata switching to mirror cache mode, sets the lock bits to lock all to switch to lock all state so that THIS controller has access to all quadrants Q0 through Q3. OTHER controller remains in start up state. Next in state 120, THIS controller reboots and goes to start up state while OTHER controller reads the metadata just written in state 118. OTHER controller reads this metadata by setting the lock signals to lock all or access to all quadrants by OTHER controller. OTHER controller can then read from the metadata the switch to mirror cache mode. When OTHER controller detects mirror cache mode, it sets its lock signals to mirror state in state 122. At the same time, THIS controller continues in the start up state as it reboots. From state 122 the operation flow is to state 124 in FIG. 3C. In state 124 OTHER controller remains in mirror state, but with lock signals set so that it has access to quadrants Q1 and Q2. After state 122, THIS controller completes its reboot and copies the mirror state from the OTHER controller. The system transitions from state 122 to 124 where both controllers are now in the mirror state.

State 124 is also entered from state 106 in FIG. 3A. In this situation in state 106, THIS controller is already in mirror state having detected the mirror metadata in the transition from state 102 to state 106. OTHER controller finishes its reboot and copies the mirror state of THIS controller. Therefore, the system transitions from state 106 to state 124 in FIG. 3C where both controllers are in mirror state. State 124 is thus the normal operational state for mirror cache mode or partial mirror cache mode operation discussed in above cross-referenced application entitled "Enabling mirror, Non-Mirror, and Partial Mirror Mode", Ser. No. 08/671,153 which application is incorporated herein by reference. The cache memory system will stay in state 124 unless one of the controllers crashes or one of the controllers receives a set non-mirror mode command through the command line interpreter. Assuming OTHER controller crashes, then the system would transition from state 124 to state 126.

In state 126 THIS controller remains in mirror state while OTHER controller has changed to the start up state. THIS controller detects the change to start up state by OTHER controller and the cache system transitions to state 128. In state 128 THIS controller locks all the quadrants so as to have access to all quadrants. Meanwhile OTHER controller is rebooting and waiting. With THIS controller being in a lock all state and having access to all quadrants, THIS controller will perform a fail over operation whereby it may recover data previously accessed through OTHER controller.

After state 128, THIS controller reads the mirror metadata and transitions to state 130. In state 130 THIS controller is in mirror state and has its lock signals set to access quadrants Q0 and Q3. OTHER controller is in start up state. When OTHER controller detects that THIS controller is in mirror state, it copies the mirror state from THIS controller and the cache system transitions back to state 124 where both controllers are in mirror state.

The other transition from the state 124 which is the operational state for mirror mode, is where a user command sets one of the controllers to non-mirror mode. Assuming that the cache memory system detects a set cache mode command through THIS controller, the cache memory system transitions from state 124 to state 132. In state 132 THIS controller is still in mirror state and OTHER controller has been killed by a signal from THIS controller so that OTHER controller is in a start up state. After OTHER controller enters the start up state, the cache memory system transitions to state 134. In state 134, THIS controller locks all quadrants and writes the new metadata indicating a cache mode to the quadrants. OTHER controller remains in start up state in a wait condition. After the new metadata is written, the cache memory system transitions to state 136 where THIS controller then reboots and OTHER controller reads the new metadata just written during state 134. To read the metadata, the OTHER controller locks all quadrants so that it has access to all quadrants. After reading the new metadata, the cache memory system transitions to state 138 where OTHER controller sets lock signals to non-mirror state so that it has access to quadrants Q2 and Q3. THIS controller finishes its start up state and copies the non-mirror lock state from OTHER controller. In so copying the non-mirror lock state, the result is a cache memory system transitioning from state 138 back to state 108 (FIG. 3A) where both controllers are in non-mirror state.

While the operational flow has been described for OTHER controller crashing and THIS controller state being changed by set cache mode commands, it should be apparent to one skilled in the art that the same operation flow will occur if THIS controller crashes or if OTHER controller receives a set cache mode command.

While the invention has been particularly shown and described with reference to a preferred embodiment thereof, it will be understood by those skilled in the art that various other changes in the form and details may be made therein without departing from the spirit and scope of the invention.

What is claimed is:

1. A method for synchronizing a cache mode in a cache memory system in a computer, the cache memory system having a first controller and a second controller and a first cache module and a second cache module and operating in a plurality of cache modes, said method comprising steps of:

initializing the first controller and the second controller to a startup state;

detecting initialization has been completed by the first controller;

setting the first controller to a lock all state allowing the first controller access to the first and the second cache modules;

determining by the first controller a cache mode stored in a first metadata in the first cache module and a second metadata in the second cache module;

setting a cache mode state in the first controller in accordance with the cache mode determined;

determining the cache mode state in the first controller by the second controller; and setting the cache mode state in the second controller to synchronize the first controller and the second controller in the same cache mode state.

2. The method of claim 1 further comprising the steps of:

detecting a request for a new cache mode by the first controller;

setting a new cache mode state in the first controller corresponding to the new cache mode;

determining the new cache mode state in the first controller by the second controller; and setting the new cache mode state in the second controller to synchronize the first controller and the second controller in the same new cache mode state.

3. The method of claim 1 further comprising the steps of:

detecting in the first controller that the second controller has failed; and locking access to the first and the second cache modules by the first controller to recover data previously accessed by the second controller.

4. The method of claim 3 further comprising the steps of:

operating the first controller in the cache mode state prior to failure of the second controller;

initializing the second controller to the start up state;

copying the cache mode state of the first controller by the second controller whereby the second controller returns to the cache mode state prior to the failure of the second controller.

5. Apparatus for synchronizing a cache mode in a cache memory system comprising:

a first cache module, such first cache module storing a first metadata;

a second cache module, such second cache module storing a second metadata; and a first controller, such first controller comprising a control logic circuitry for determining the cache mode from the first metadata and the second metadata and setting lock signals and a cache mode state in accordance with the determined cache mode; and a second controller, such second controller comprising a control logic circuitry for detecting the cache mode state in the first controller and setting lock signals in the second controller to synchronize the first controller and the second controller in the same cache mode state.

6. The apparatus of claim 5 wherein the lock signals from the first controller and the second controller control access by the first controller and the second controller to the first cache module and the second cache module.

7. The apparatus of claim 5 wherein the lock signals from the first controller and the second controller control synchronization of the cache mode state by the first controller and the second controller to the first cache module and the second cache module.

8. The apparatus of claim 5 wherein the lock signals from the first controller and the second controller control direction of error indications to the first controller as a result of improper access to the first cache module or the second cache module by the first controller.

\* \* \* \* \*